US010843656B2

(12) United States Patent
Kobayashi et al.

(10) Patent No.: US 10,843,656 B2
(45) Date of Patent: Nov. 24, 2020

(54) SIDE AIRBAG DEVICE

(71) Applicants: Yuto Kobayashi, Yokohama (JP); Hiroyuki Taguchi, Yokohama (JP)

(72) Inventors: Yuto Kobayashi, Yokohama (JP); Hiroyuki Taguchi, Yokohama (JP)

(73) Assignee: AUTOLIV DEVELOPMENT AB, Vargarda (SE)

( * ) Notice: Subject to any disclaimer, the term of this patent is extended or adjusted under 35 U.S.C. 154(b) by 66 days.

(21) Appl. No.: 16/094,409

(22) PCT Filed: May 11, 2017

(86) PCT No.: PCT/JP2017/017883
§ 371 (c)(1),
(2) Date: Oct. 17, 2018

(87) PCT Pub. No.: WO2017/199851
PCT Pub. Date: Nov. 23, 2017

(65) Prior Publication Data
US 2019/0118759 A1    Apr. 25, 2019

(30) Foreign Application Priority Data
May 20, 2016   (JP) ................................ 2016-101614

(51) Int. Cl.
*B60R 21/239*      (2006.01)
*B60R 21/2338*     (2011.01)
(Continued)

(52) U.S. Cl.
CPC .......... *B60R 21/239* (2013.01); *B60R 21/235* (2013.01); *B60R 21/2338* (2013.01);
(Continued)

(58) Field of Classification Search
CPC ............... B60R 21/239; B60R 21/235; B60R 21/23138; B60R 21/2338;
(Continued)

(56) References Cited

U.S. PATENT DOCUMENTS 5,845,935 A * 12/1998 Enders .............. B60R 21/23138
280/743.2
2002/0096871 A1* 7/2002 Pinsenschaum ...... B60R 21/233
280/743.2
(Continued)

FOREIGN PATENT DOCUMENTS

JP        2000-1290 A       5/2000
JP        2004-189187 A     7/2004
(Continued)

OTHER PUBLICATIONS

International Search Report for PCT/JP2017/017883, ISA/JP, Tokyo, dated Jun. 13, 2017.

*Primary Examiner* — Frank B Vanaman
(74) *Attorney, Agent, or Firm* — Stephen T. Olson; Harness, Dickey & Pierce, P.L.C.

(57) ABSTRACT

A side airbag device includes: an inflator; a cushion that is expandable from the side of a seat toward a front of a vehicle; a vent hole that is provided at a predetermined position of the cushion and that discharges the gas; a patch that openably covers the vent hole from an inside of the cushion; a tether that is connected to the patch and a predetermined position (a tether cutter) of the side of the seat, the tether pulling the patch toward a rear of the vehicle so as to open the vent hole when the cushion is expanded and deployed; and a tether cutter that is configured to cut the tether in response to information relating to a state of the vehicle.

20 Claims, 5 Drawing Sheets

(51) Int. Cl.
*B60R 21/231* (2011.01)
*B60R 21/235* (2006.01)

(52) U.S. Cl.
CPC ............... *B60R 21/23138* (2013.01); *B60R 2021/2395* (2013.01); *B60R 2021/23146* (2013.01); *B60R 2021/23384* (2013.01); *B60R 2021/23538* (2013.01)

(58) Field of Classification Search
CPC .. B60R 2021/2395; B60R 2021/23538; B60R 2021/23384; B60R 2021/23146
See application file for complete search history.

(56) References Cited

U.S. PATENT DOCUMENTS

| | | | |
|---|---|---|---|
| 2002/0175511 A1* | 11/2002 | Dunkle | B60R 21/233 280/743.2 |
| 2004/0188989 A1* | 9/2004 | Kanto | B60R 21/23138 280/730.2 |
| 2006/0043702 A1* | 3/2006 | Jamison | B60R 21/233 280/729 |
| 2006/0151975 A1 | 7/2006 | Yamaji et al. | |
| 2007/0024043 A1* | 2/2007 | Abe | B60R 21/233 280/743.2 |
| 2007/0045997 A1* | 3/2007 | Abe | B60R 21/231 280/729 |
| 2008/0203711 A1 | 8/2008 | Shimono | |
| 2009/0121460 A1 | 5/2009 | Abe et al. | |
| 2010/0201107 A1 | 8/2010 | Abe et al. | |
| 2013/0038046 A1 | 2/2013 | Inuzuka et al. | |

FOREIGN PATENT DOCUMENTS

| | | |
|---|---|---|
| JP | 2005-22524 A | 1/2005 |
| JP | 2008-179337 A | 8/2008 |
| JP | 2008-308139 A | 12/2008 |
| JP | 2010-006237 A | 1/2010 |
| JP | 2013-35473 A | 2/2013 |
| WO | WO-2006/049093 A1 | 5/2006 |

* cited by examiner

A-A Cross Section

C-C Cross Section

SIDE AIRBAG DEVICE

CROSS-REFERENCE TO RELATED APPLICATIONS

This application is a 371 U.S. National Stage of International Application No. PCT/JP2017/017883, filed May 11, 2017, which claims priority to Japanese Patent Application No. 2016-101614, filed May 20, 2016. The disclosures of the above applications are incorporated herein by reference.

TECHNICAL FIELD

The present invention relates to a side airbag device that has an inflator that supplies a gas and an airbag cushion that is provided at a side part of a vehicle seat and that is expandable from the side part to a front side of the vehicle by the gas.

BACKGROUND ART

In the recent years, an airbag device is mostly equipped as the standard equipment on a vehicle. The airbag device is a safety device being operated in an emergency such as a vehicle collision and protects an occupant by receiving the occupant by expanding and deploying an airbag cushion with a gas pressure. There are various kinds of airbag devices according to the installation positions or the use. For instance, a front airbag device is provided at a center of a steering wheel so that a driver can be protected from a collision in front and rear directions. In addition, in order to protect occupants from an impact in a vehicle width direction by such as a side collision, a curtain airbag device is provided near a ceiling above a side window and a side airbag device is provided at a side part of a seat.

A shape of an airbag cushion is set in consideration of such as a positional relationship with an occupant and a surrounding structure. For instance, a vehicle airbag of Patent Document 1 has an airbag body for a passenger seat in which a capacity is relatively large. In Patent Document 1, in consideration of the positional relationship with a head of the occupant, an expansion control tether is provided inside of the airbag body. By pulling a base cloth of the airbag body from the inside, the expansion control tether suppresses the expansion and the load to the occupant.

PRIOR ART DOCUMENT

Patent Document

Patent Document 1: Japanese Patent Publication Number 2000-142290.

SUMMARY OF THE INVENTION

Problems to be Solved by the Invention

With respect to an airbag cushion of a side airbag device, a measure for suppressing the load that an occupant receives during the restraint is requested as well. For instance, the load that can be given to the occupant by the airbag cushion increases in proportion to such as a collision speed at a vehicle collision. An internal pressure of the airbag cushion corresponds to an output of an inflator that is an origin of a supply of the gas, however, it is not an efficient means to modify the output itself of the inflator according to the collision speed from the point of the complication of the structure and the cost.

The present invention attempts to solve these problems. An object of the present invention is to provide a side airbag device that can adjust an internal pressure of an airbag cushion according to various conditions such as a collision speed, a collision angle, a physique of an occupant, and collision energy at a vehicle collision.

Means for Solving the Problems

In order to solve the above problems, a side airbag device according to the present invention includes the following most essential features: an inflator that supplies a gas; an airbag cushion that is disposed at a side of a seat of a vehicle and that is expandable from the side toward a front of the vehicle by the gas; a vent hole that is provided at a predetermined position of the airbag cushion and that discharges the gas; a patch that openably covers the vent hole from an inside of the airbag cushion; a tether that is connected to the patch and a predetermined position of the side of the seat, the tether pulling the patch toward a rear of the vehicle so as to open the vent hole when the airbag cushion is expanded and deployed; and a tether cutter that is configured to cut the tether in response to information relating to a state of the vehicle.

According to the configuration explained above, it becomes possible to adjust the rigidity of the airbag cushion in response to the information relating to the state of the vehicle. For instance, when a sensor for a side collision and a weight detection sensor of the occupant that is formed in the seat are utilized, the information regarding the collision speed in a horizontal (sidewise) direction and the physique of the occupant can be obtained, and a tether can be cut when a predetermined condition is met. For instance, when the collision speed in the horizontal direction is lower, because a moving speed in the horizontal direction of the occupant also becomes low, an injury value of the airbag cushion for the occupant are not so high although the airbag cushion is hard and expanded with a high internal pressure. Further, when the physique of the occupant is equal to or more than a predetermined value (for instance, is equal to or more than a pertinent value for an adult male), a tolerance for the collision energy is expected to be high. Accordingly, when the collision speed in the horizontal direction is lower than the predetermined value and the physique of the occupant is equal to or more than the predetermined value, the tether is cut by a tether cutter so that the vent hole is closed, and as a result, a pressure of the airbag cushion is kept high by preventing the gas from discharging. As a result, the occupant can be sufficiently restrained.

On the other hand, when the collision speed in the horizontal direction is high, the moving speed of the occupant in the horizontal direction also becomes high, therefore, the injury value for the occupant also tends to be high. Further, when the physique of the occupant is less than the predetermined value (for instance, is less than the pertinent value for the adult male), the tolerance for collision energy is also expected to be low. Accordingly, when the collision speed is equal to or more than the predetermined value and when the physique of the occupant is less than the predetermined value, the tether cutter does not move, the vent hole is open by pulling the patch by the tether, and a cushion internal pressure of the airbag cushion is suppressed by discharging the gas from the vent hole. Therefore, when the occupant who has the higher moving speed or who is a petite occupant is restrained, the injury value for the occupant can be suppressed.

The side airbag device may further have sewing parts in which the patch and at least both-side areas of the airbag cushion that sandwiches the vent hole are connected by sewing. The sewing parts may be linearly provided in parallel with each other at the both-side areas of the airbag cushion that sandwiches the vent hole. According to these configurations, the patch can be suitably connected to the airbag cushion.

The vent hole may be provided in an edge of a vehicle front side of the airbag cushion. Further, the vent hole may be provided in a side surface of the airbag cushion in a vehicle width direction and is close to a vehicle front side of the airbag cushion. According to the vent hole having these configurations, the gas can also be suitably discharged.

An intermediate portion of the tether in a longitudinal direction may be connected to the patch, and a front end of the tether may be connected to an inner position of the airbag cushion. The inner position is located further to a vehicle front side than the vent hole. According to this configuration, the vent hole can be suitably opened by pulling the patch by the tether.

The tether may be connected to the patch at a center of the vent hole. According to this configuration, the vent hole can also be suitably opened by pulling the patch by the tether.

The airbag cushion may have an outer peripheral sewing part in which a base cloth at an edge of the airbag cushion is sewed, and one end of the patch and one end of the tether may be sewed together with the outer peripheral sewing part. According to this configuration, the patch and the tether can be connected to the airbag cushion in a concise manner. Further, by the tether, the expansion in the vehicle longitudinal direction of the cushion is limited and it becomes possible that the cushion is further thickly expanded in the vehicle width direction so that an occupant restraint force is increased.

The patch may have a slit that extends in a direction crossing a longitudinal direction of the tether. By opening the slit, the gas can be suitably discharged. Further, the tether may pass through the patch via the slit in a vehicle front and rear direction. According to this configuration, the slit can be suitably opened.

The inflator is disposed inside of the airbag cushion at a vehicle rear side. The side airbag device further including: an inner bag that is provided inside of the airbag cushion, a base cloth of the inner bag surrounds the inflator; and an inner vent that is disposed at a vehicle front side of the inner gag and through which the gas is passable. Further, the tether may pass through the inner vent so as to be connected to the patch and the predetermined position of the side of the seat.

According to the configuration explained above, because the inner bag takes the initiative to receive the gas that is supplied from the inflator at first, it can be prevented that the rigidity at the part that contacts the occupant is rapidly increased.

It is preferred that the inner vent is located on a linear line connecting between the patch and the predetermined position of the side of the seat. According to this configuration, the tether can bridge over at the shortest distance.

Effects of the Invention

According to the present invention, it becomes possible to provide a side airbag device that can adjust an internal pressure of an airbag cushion according to a collision speed at a vehicle collision.

EXPLANATION OF REFERENCE SIGNS

Figure 1:
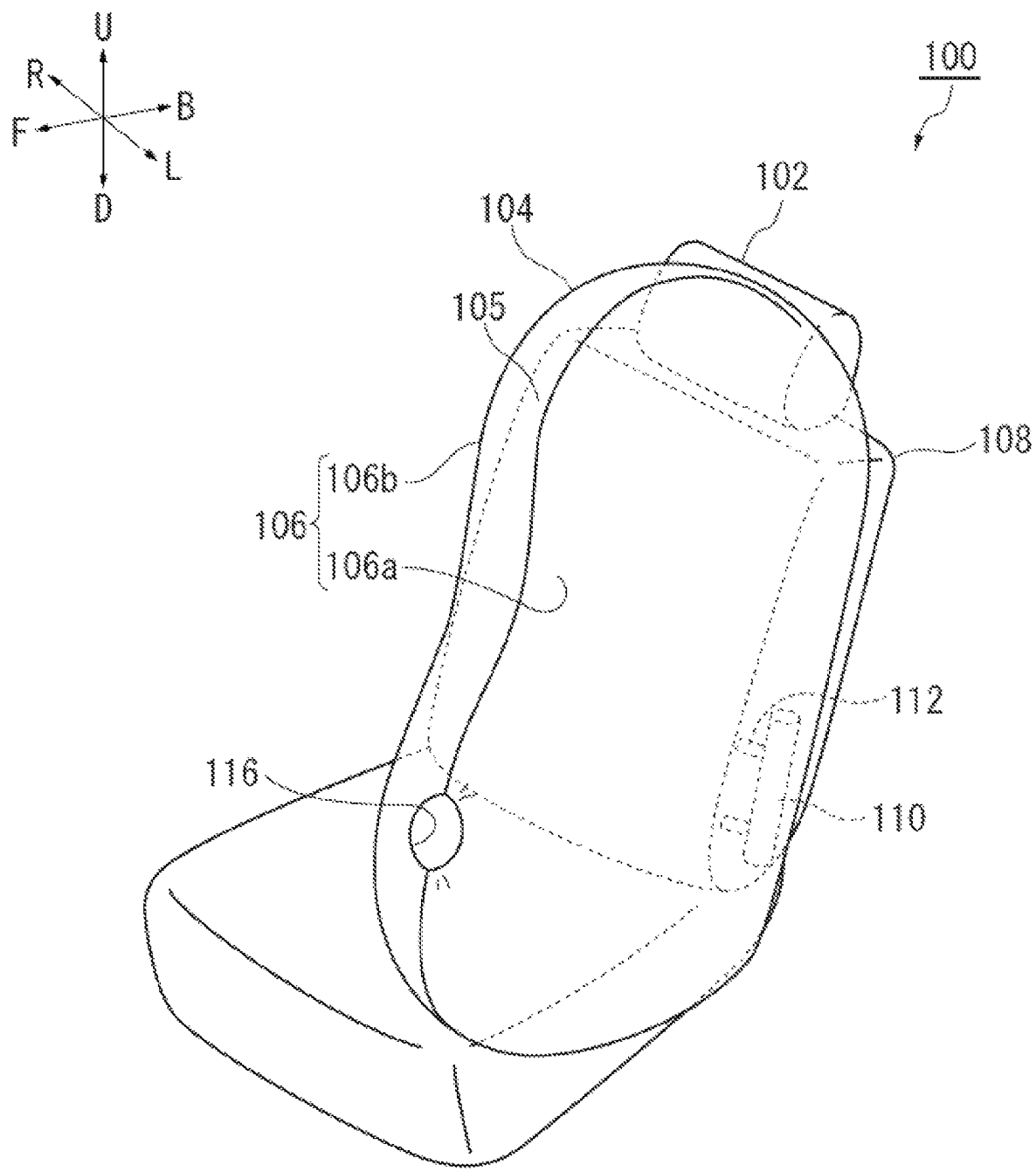
FIG. 1 is a diagram that exemplarily shows a side airbag device according to a first embodiment of the present invention.

L1—Length of Tether, L2—Distance between Vent Hole and Tether Cutter, L3—Length of Tether in the second embodiment, L4—Distance between Front End of Cushion and Tether Cutter, L5—Length of Tether in the third embodiment, 100—Side Airbag Device in the first embodiment, 102—Seat, 104—Cushion, 105—Outer Peripheral Sewing Part, 106—Main Panel, 106a—Main Panel on the left side in the Vehicle Width Direction, 106b—Main Panel on the right side in the Vehicle Width Direction, 108—Seat Back, 110—Inflator, 112—Stud Bolt, 116—Vent Hole, 118—Inner Bag, 120a—Upper Inner Vent, 120b—Lower Inner Vent, 122—Patch, 122a—Left Edge of Patch, 122b—Right Edge of Patch, 122c—Upper Edge of Patch, 122d—Lower edge of Patch, 124a—Left Sewing Part, 124b—Right Sewing Part, 126—Tether, 128—Tether Cutter, 130—Connector, 132—Sensor, 134—Control Unit, 200—Side Airbag Device in the second embodiment, 202—Vent Hole, 204—Patch, 206—Tether, 208—Front End of Tether, 300—Side Airbag Device in the third embodiment, 302—Patch, 302a—Upper End of Patch, 302b—Lower End of Patch, 304—Slit, 306—Tether, 308—Front End of Tether, 400a—Upper Sewing Part of Variation, 400b—Lower Sewing Part of Variation

MODE FOR CARRYING OUT THE INVENTION

Preferred embodiments of the present invention will be explained in detail with reference to the attached drawings below. The dimensions, materials, other concrete numerical values, and other that are disclosed in the embodiments are merely examples for facilitating understanding of the invention, and unless otherwise stated, they are not limited the present invention. Further, in this specification and the drawings, with respect to the elements having substantially the same functions and configurations, redundant explanations are omitted by accompanying the same reference numerals. Further, the elements that are not directly related to the present invention are not shown in the drawings.

First Embodiment

FIG. 1 is a diagram that exemplarily shows a side airbag device 100 according to a first embodiment of the present invention. FIG. 1A exemplarily shows the side airbag device 100 and a seat 102 in which the side airbag device 100 is utilized viewed from a left side in a vehicle width direction. In the following disclosures, with respect to FIG. 1 and all other diagrams according to the present invention, the vehicle front and rear (longitudinal) directions respectively denote the arrows F (Forward) and B (Back), the crosswise directions that correspond to an interior side and an exterior side in the vehicle width direction respectively denote the arrows L (Left) and R (Right), and the vehicle vertical directions respectively denote the arrows U (Up) and D (Down).

As shown in FIG. 1, the side airbag device 100 has a configuration in which an airbag cushion (a cushion 104) is expanded and deployed from an inside of a seat back 108 of the seat 102. The cushion 104 is the portion in which the occupant is restrained in an emergency and is housed in a side part of the seat back 108 in the vehicle width direction in the state of being wound or folded prior to its operation. Thereafter, by detecting the impact of the vehicle, the expansion and the deployment are performed from the side part toward the vehicle front side by utilizing a gas.

In the present embodiment, the cushion 104 is provided on the left side of the seat back 108, however, it is possible that the cushion 104 is provided on the right side. That is, the cushion 104 can be provided either at the side part on the door side (near side) or at the side part of the interior side (far side) of the seat back 108.

The cushion 104 is formed in a flat shape as a whole. An outside surface of the cushion 104 is configured with a main panel 106 (a main panel 106a at the left side in the vehicle width direction, a vehicle main panel 106b at the right side in the vehicle width direction). The main panel 106 is obtained from a base cloth and is formed in a bag shape as a whole by a sewing or an adhesion. Further, the cushion 104 can also be formed by the spinning and weaving by the utilization of OPW (One-Piece Woven).

An inflator 110 is installed at a vehicle rear side of an inside of the cushion 104. The inflator 110 is a gas generator and a cylinder type (a cylindrical type) is adopted in the present embodiment. The inflator is electrically connected to the vehicle side and is operated by receiving a signal caused by the detection of the impact from the vehicle side so as to supply the gas to the cushion 104. The inflator 110 has a stud bolt 112 that is fastened to the seat back 108. Because the stud bolt 112 is fastened to the seat back 108 by penetrating through the cushion 104, the cushion 104 is also attached to the seat back 108.

There are some kinds of the inflators, such as a model in which a gas generating agent is charged and a gas is generated by burning the gas generating agent, a model in which a compressed gas is filled and a gas is supplied without generating heat, or a hybrid model in which a combustion gas and a compressed gas are used as an inflator spread through the market at the present time. Any kinds of the inflators can be utilized as the inflator 110.

A vent hole 116 is provided in a slightly lower part of an edge at a vehicle front side of the cushion 104. The vent hole 116 discharges the gas, which is supplied from the inflator 110, from the inside of the cushion 104.

The side airbag device 100 according to the present embodiment can adjust the internal pressure of the cushion 104 according to a state of the vehicle by utilizing the vent hole 116. In the present embodiment, as an example of the state of the vehicle, the internal pressure of the cushion 104 is adjusted according to the collision speed or the physique of the occupant at the vehicle collision. For instance, when the collision speed in a horizontal (sidewise) direction is high at the time of the side collision, the moving speed in the horizontal direction of the occupant becomes high and the load that the occupant receives tends to be increased during the restraint of the occupant by the cushion 104. Similarly, even for the petite occupant, the tolerance for collision energy is expected to be low. Accordingly, in the present embodiment, when the predetermined conditions are met, such as, when the collision speed in the horizontal direction is higher than the predetermined value or when the physique of the occupant is less than the predetermined value, a configuration, in which the gas is discharged from the vent hole 116, is adopted so that the internal pressure of the cushion 104 is reduced.

Figure 2A:
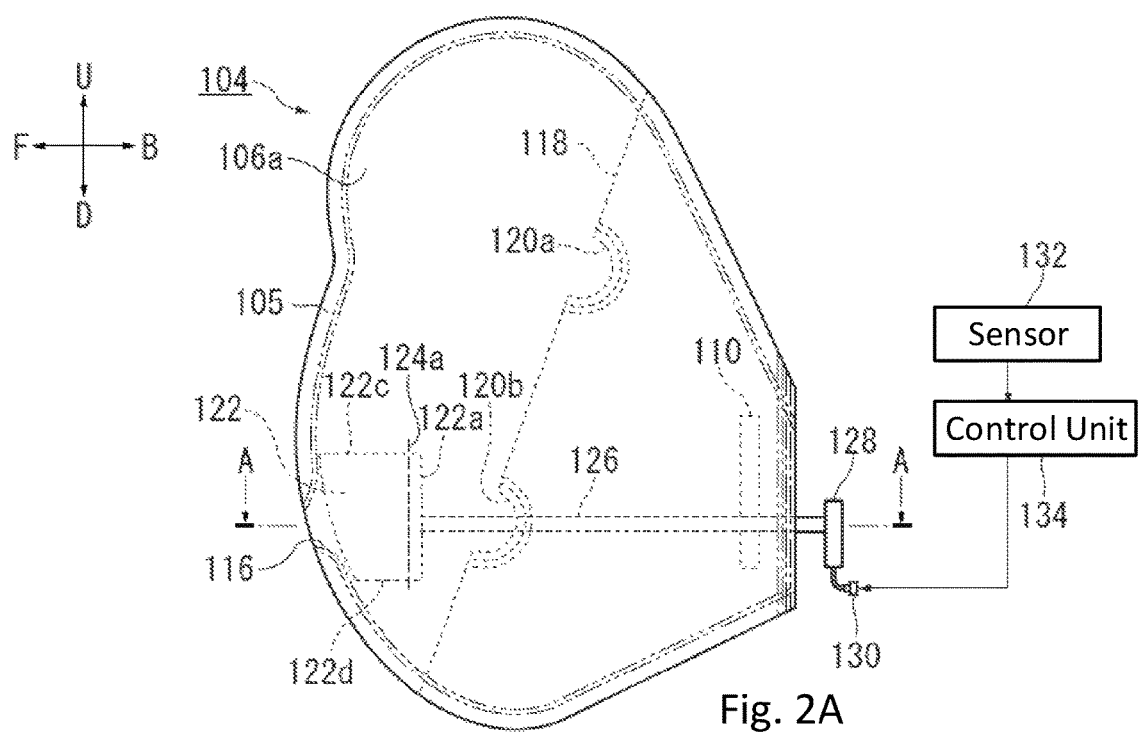
FIG. 2A is a side view of the side airbag device of FIG. 1, the side airbag device shown operatively associated with a sensor and control unit.

FIG. 2 is a diagram that exemplarily shows each cushion 104 shown in FIG. 1 viewed from each of directions. FIG. 2A is a diagram that exemplarily shows the cushion 104 while transmitting the inside viewed from the left side in the vehicle width direction.

An inner bag 118 is provided inside of the cushion 104. The inner bag 118 is provided to surround the inflator 110 inside of the cushion 104. Because the inner bag 118 receives the gas that is supplied from the inflator 110 before the main panel 106 receives, it is possible to prevent the rigidity of the main panel 106 that contacts with the occupant from being rapidly increased.

The inner bag 118 is provided in a bag shape enclosing the inflator 110 therein. The inner bag 118 can also be provided in a manner in which, for instance, a base cloth that is fitted to the shape of the vehicle rear side of the cushion 104 is folded and arranged in the bag shape and a part thereof is overlapped and sewed together with the outer circumference of the main panels 106a and 106b (refer to FIG. 1).

As the portions for supplying the gas to the vehicle front side of the cushion 104, two openings, which are an inner vent 120a at the top portion and an inner vent 120b at the bottom portion of the vehicle front side, are provided in the inner bag 118. The gas that is supplied from the inflator 110 respectively passes through the inner vents 120a and 120b and flows toward the vehicle front side. As explained above, in the present embodiment, the configuration in which the inner bag 118 receives the gas from the inflator 110 first, and subsequently, the gas is supplied to the entirety of the cushion 104 from the inner bag 118 is adopted.

A patch 122 is provided inside of the vent hole 116. The patch 122 openably covers the vent hole 116 from the inside of the cushion 104. For instance, the patch 112 uses the same base cloth as, for example, the main panel 106 and is provided by being connected to both-side parts in the vehicle width direction sandwiching the vent hole 116 of the cushion 104 by linear sewing parts 124a and 124b (refer to FIG. 2B). For instance, by providing the sewing parts 124a and 124b at both sides of the vent hole 116 in parallel, because right and left edges 122a and 122b of the patch 122 are connected to the cushion 104 and because upper and lower edges 122c and 122d of the patch 122 can become separated from the cushion 104, the patch 122, which can be opened and closed, can be suitably realized.

A string-like tether 126 is connected to the patch 122. The tether 126 is the portion to make the vent hole 116 be opened by pulling the patch 122 according to the detection result of a sensor 132 at the time of the expansion and the deployment of the cushion 104. The tether 126 penetrates the inner bag 118 through the inner vent 120b so as to be connected to a tether cutter 128 at the vehicle rear side. The inner vent 120b is provided on the path linearly connecting the patch 122 and the tether cutter 128 so that the tether 126 can bridge over the patch 122 and the tether cutter 128 at the shortest distance.

The tether cutter 128 is small, has a cylindrical shape, and is provided at a predetermined position of the side part of the seat 102 (refer to FIG. 1) together with such as the cushion 104. A cylinder (not shown) having a cutting edge and a micro gas generator (not shown) are provided inside of the tether cutter 128. The tether cutter 128 is electrically connected to such as a power source and a sensor 132 of the vehicle side by a connector 130, and the cutting edge moves according to the detection result of the sensor 132. The tether 126 is passed through a hole (not shown) of the tether cutter 128 and is fastened to the tether cutter 128 in a state in which the tether 126 can be cut by the tether cutter 128.

The sensor 132 is provided at various places of the vehicle, measures and detects the states of the vehicle, and obtains the various predetermined information from the vehicle. As the sensor 132, various sensors can be utilized, for instance, a sensor for the side collision that detects the collision speed in the vehicle horizontal direction by being provided at the side part of the vehicle, a sensor for the front collision that detects the collision speed in the vehicle longitudinal direction by being provided at the front part of the vehicle, and a weight detection sensor that detects the weight or the physique of the occupant by being provided at the seat.

A control unit 134 processes each information that is obtained by the sensor 132 and controls the movability of the tether cutter 128 according to the predetermined condition (for instance, whether the collision speed in the horizontal direction is higher or lower than the predetermined value). The control unit 134 can also be utilized by multiply processing the detection results of a plurality of sensors, and as a result, the various information such as the collision speed, the collision angle, the collision energy, and the physique of the occupant at the vehicle collision are calculated, and it is possible to decide whether a movability signal is sent to the tether cutter 128 or not subject to the above calculated information.

Figure 2B:
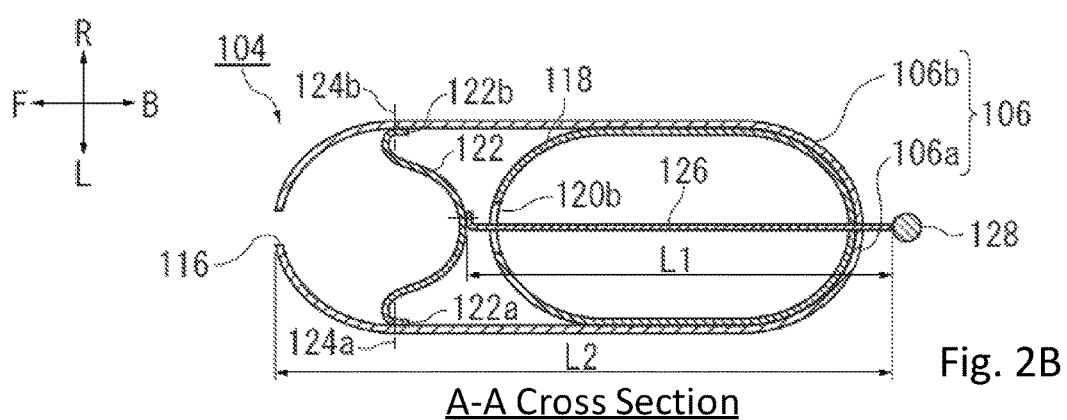
FIG. 2B is a cross-sectional view taken along the line A-A of FIG. 2A before the tether is cut.

FIG. 2B is a cross sectional view along the A-A line of the cushion 104 shown in FIG. 2A. FIG. 2B shows a state of the cushion 104 after the movement of the inflator 110. In the present embodiment, when the injury value for the occupant is expected to become high during the restraint, the control unit 134 does not move the tether cutter 128. In this case, because the patch 122 is pulled toward the vehicle rear side by the tether 126, a gap between the patch 122 and the vent hole 116 is widened so that the gas is discharged from the vent hole 116. As a result, the internal pressure of the cushion 104 is suppressed and the rigidity of the main panel 106 is also reduced. Therefore, the load that is given to the occupant who contacts with the main panel 106 can be suppressed.

The tether 126 is connected to the patch 122 at the center of the vent hole 116 so as to efficiently separate the patch 122 from the vent hole 116. Further, the tether 126 has a length L1 that is shorter than a distance L2 between the vent hole 116 and the tether cutter 128 at the time of the expansion and the deployment of the cushion 104 (L1>L2). The tether 126 with this length L1 can open the vent hole by suitably pulling the patch 112.

Figure 2C:
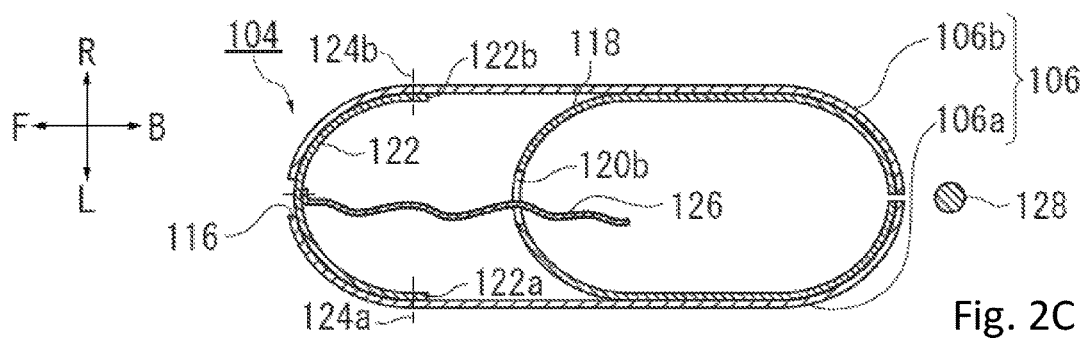
FIG. 2C is a cross-sectional similar to FIG. 2B shown after the tether is cut.

Unlike FIG. 2B, FIG. 2C shows a state of the cushion 104 when the injury value for the occupant is expected to become low during the restraint. In this case, an operation signal from the control unit 134 (refer to FIG. 2A) is sent to the tether cutter 128 through the connector 130 so that the cutting edge moves and the tether 126 is cut. As a result, the patch 122 covers in such a way as to stick the vent hole 116 by the gas pressure and keeps the vent hole 116 closed so as to prevent the gas from discharging from the cushion 104. As a result, the pressure of the cushion 104 can be kept high. Therefore, the cushion 104 can sufficiently restrain the occupant by the high internal pressure.

The example of the control of the tether cutter 128 with a focus on the control unit 134 shown in FIG. 2A will be explained in detail. The control unit 134 can control the tether cutter 126 based on the information regarding the state of the vehicle such as the collision speed or the physique of the occupant that is obtained by the sensor 132.

For instance, the control unit 134 may control the tether cutter 128 subject to the collision speed. In the side collision, when the collision speed in the vehicle horizontal direction is high, the moving speed in the horizontal direction of the occupant also becomes high and there is a possibility that the injury value becomes high during the restraint by the cushion 104. Accordingly, when the collision speed that is obtained by the sensor for the side collision is equal to or higher than the predetermined threshold value (for instance: 30 km/h), the control unit 134 can determine not to send the movability signal to the tether cutter 128. As a result, as exemplarily shown in FIG. 2B, the patch 122 is pulled by the tether 126 and the gas is discharged from the vent hole 116 so that the internal pressure of the cushion 104 is reduced. On the contrary, the collision speed is less than the threshold value, the control unit 134 determines to send the movability signal to the tether cutter 128. As a result, as shown in FIG. 2C, the tether 126 is cut and the vent hole 116 is closed by the patch 122, and the internal pressure of the cushion 104 is kept high.

As another example for the control, the control unit 134 can also control the tether cutter 128 subject to the physique of the occupant. In case of the petite occupant, because the tolerance for collision energy is expected to be low, there is a possibility that the injury value becomes high during the restraint by the cushion 104. Accordingly, when the information regarding the physique of the occupant that is obtained by the weight detection sensor at the seat is less than the predetermined threshold value (for instance: the physique of the adult male), the control unit 134 can determine not to send the movability signal to the tether cutter 126. As a result, as exemplarily shown in FIG. 2B, the patch 122 is pulled by the tether 126 and the gas is discharged from the vent hole 116, and the internal pressure of the cushion 104 is reduced. On the contrary, when the physique of the occupant is equal to or more than the threshold value, because the tolerance for collision energy is expected to be high, the control unit 134 determines to send the movability signal to the tether cutter 128. As a result, as shown in FIG. 2C, the tether 126 is cut and the vent hole 116 is closed by the patch 122 so that the internal pressure of the cushion 104 is kept high.

Further, as the concrete example for the judgement of the physique of the occupant, for instance, it is possible to utilize a dummy doll AM50 (corresponds to a male of 50th percentile, the height is 175 cm and the weight is 78 kg) shaped like the physique that conforms the 50% of the average United States adult males for testing as the threshold value.

As yet another example for the control, the control unit 134 can control the tether cutter 128 by modifying the threshold value according to the physique of the occupant. Even by the same collision speed, if the physiques of the occupant are different, the injury values fluctuate. Accordingly, for instance, when the physique of the occupant is determined to correspond to the adult male, it is also possible that the control unit 134 considers that the tolerance to the impact energy is high so as to increase the threshold value of the collision speed and determines to move the tether cutter 128 so as to maintain the internal pressure of the cushion main body 120 high even though the collision speed is high. Further, for instance, when the physique of the occupant is determined to correspond to the petite woman, it is also possible that the control unit 134 considers that the tolerance to the impact energy is low so as to decrease the threshold value of the collision speed and determines not to move the tether cutter 126 so as to suppress the internal pressure of the cushion main body 120 low even though the collision speed is low.

Further, in the present embodiment, the information regarding the collision angle (an approach angle of an object with respect to the vehicle longitudinal direction) can also be obtained by utilizing such as the sensor for the front collision and the other collision detection sensor. For instance, when the vehicle is collided at the angle of being not the mere longitudinal direction and horizontal direction such as an oblique collision and an offset collision, there is a case in which a smaller value than an actual value of the collision speed that is actually applied to the occupant is obtained when the collision speed for only in the longitudinal direction or the horizontal direction is measured. As a result, it means that in case of such as the oblique collision, as compared with the cases of the front collision and the side collision, the higher value is relatively set even the same threshold value. Accordingly, when the collision speed that is applied to the occupant is calculated by also obtaining the collision angle as explained above, it becomes possible that the tether cutter 128 is controlled by accurately matching the actual collision speed.

As explained above, according to the side airbag device 100, it is possible that the choice of the presence or absence of the discharge of the gas is performed according to the various conditions such as according to the various conditions such as the collision speed, the collision angle, the physique of the occupant, and collision energy at the vehicle collision so as to adjust the internal pressure of the cushion 104. As a result, it is possible that the occupant is efficiently restrained without the increase of the injury value for the occupant.

Second Embodiment

FIG. 3 is a diagram that exemplarily shows a side airbag device 200 according to a second embodiment of the present invention. The side airbag device 200 is different from the side airbag device 100 exemplarily shown in FIG. 2 with respect to the configurations of a vent hole 202 and a patch 204. In the following descriptions, with respect to the elements that are already explained, the explanations thereof are omitted by accompanying the same reference numerals. Further, if there are the elements that have different reference numerals and if these elements have the same names with the elements that are already explained, the basic configuration and functions of these elements are the same.

With respect to the side airbag device 200, the vent hole 202 is provided close to the vehicle front side of the main panel 106a at the left side in the vehicle width direction (the outside when viewed from the seat 102 shown in FIG. 1) of the cushion 104. The vent hole 202 also has the configuration in which the gas is selectively discharged by the patch 204 according to the circumstances.

Figure 3A:
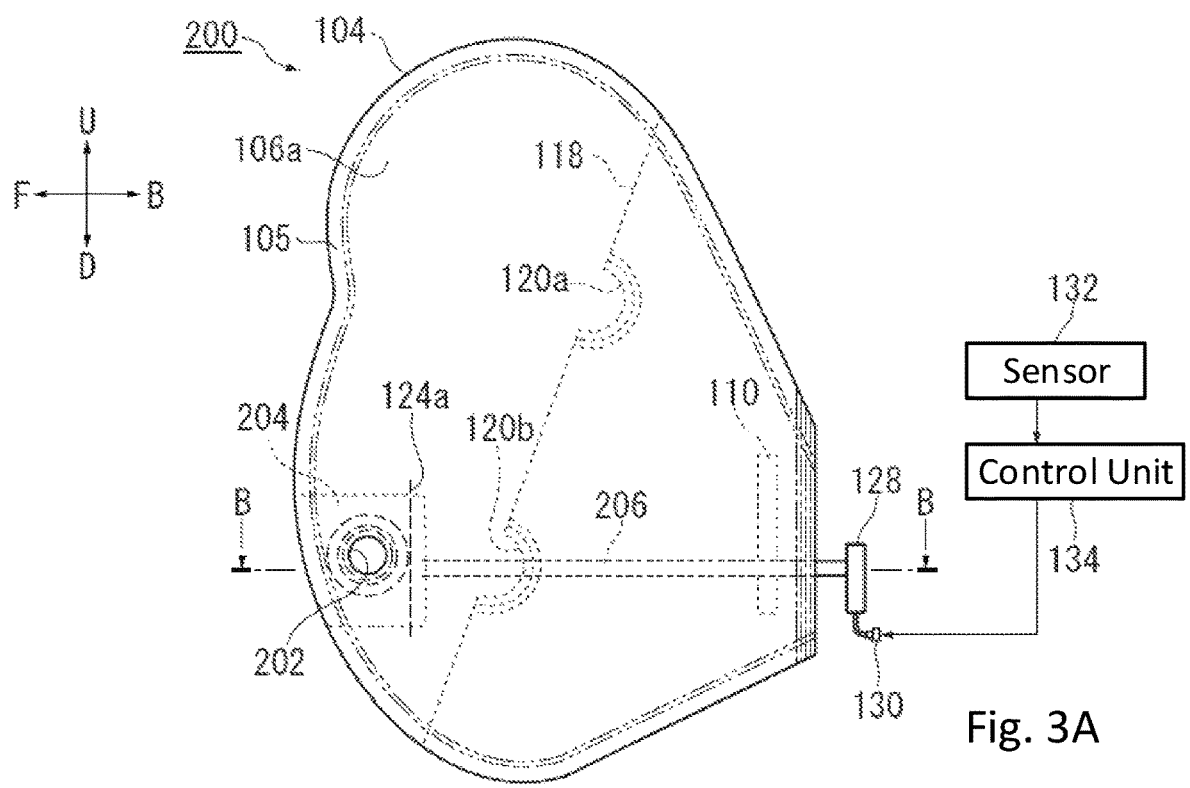
FIG. 3A is a side view similar to FIG. 2A illustrating a side airbag device according to a second embodiment of the present invention.
Figure 3B:
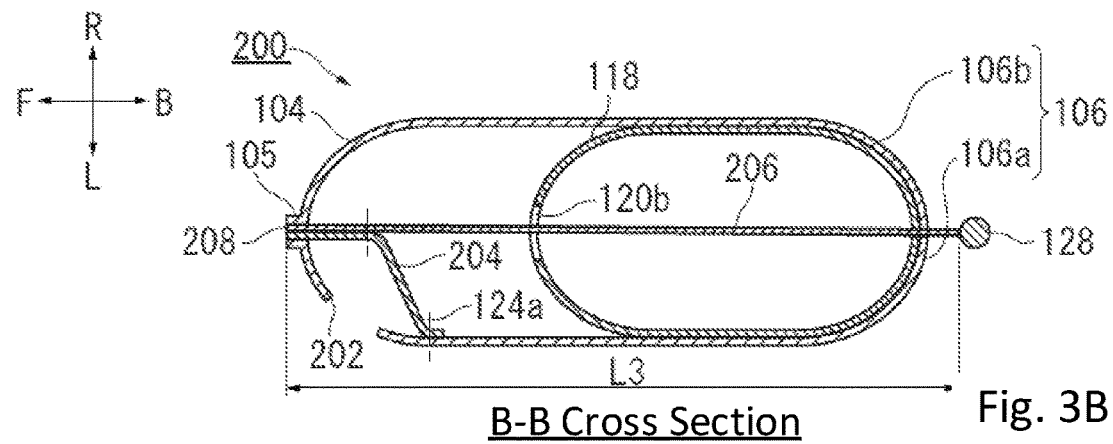
FIG. 3B is a cross-sectional view taken along the line B-B of FIG. 3A before the tether is cut.

FIG. 3B is a cross sectional view along the B-B line of the cushion 104 shown in FIG. 3A. FIG. 3B shows a state of the cushion 104 after the movement of the inflator 110. In the present embodiment, when the injury value for the occupant is expected to become high during the restraint, the tether cutter 128 does not move neither. As a result, because the patch 204 is pulled toward the vehicle rear side by a tether 206, the gap between the patch 204 and the vent hole 202 is widened so that the gas is discharged from the vent hole 202. As a result, because the internal pressure of the cushion 104 is suppressed and the rigidity of the main panel 106 is also reduced, even also when the occupant who has the higher moving speed contacts with the main panel 106, the load that the occupant receives can be suppressed.

The tether 206 has mostly the same configuration of the tether 126 shown in, for example, FIG. 2B, however, the tether 206 is connected to the patch 204 at an intermediate portion thereof in the longitudinal direction. Further, a front end 208 of the tether 206 is connected to the inside of the cushion 104 located further to the vehicle front side than the vent hole 202.

A length L3 of the tether 206 can be set to be mostly the same length as a length L4 (refer to FIG. 3C) between the front end 208 of the cushion 104 and the tether cutter 128 or less at the time of the expansion and the deployment of the cushion 104. The tether 206 having this configuration becomes tensed in the vehicle longitudinal direction at the center in the vehicle width direction of the cushion 104 according to the expansion and the deployment of the cushion 104. Therefore, because the tether 206 pulls the patch 204 toward the center side of the cushion 104, the vent hole 202 can be suitably open.

One end of the patch 204 and one end of the tether 206 are sewed together with an outer peripheral sewing part 105 of the cushion 104. The outer peripheral sewing part 105 corresponds to a peripheral edge of the cushion 104 when the cushion 104 is viewed from the vehicle width direction (refer to FIG. 3A) and corresponds to the portion in which the main panels 106a and 106b are sewed together in the vehicle width direction. The patch 204 and the tether 206 can be connected to the cushion 104 by being sewed together with the outer peripheral sewing part 105 in a concise manner.

Because the tether 206 bridges over between the outer peripheral sewing part 105 that is the front end of the cushion 104 and the tether cutter 128 at the vehicle rear side, the tether 206 limits the expansion of the cushion 104 in the vehicle longitudinal direction so that the cushion 104 can be further thickly expand in the vehicle width direction. Therefore, it becomes possible that the occupant restraint ability for the occupant who contacts in the vehicle width direction is increased and the occupant is further suitably received.

Figure 3C:
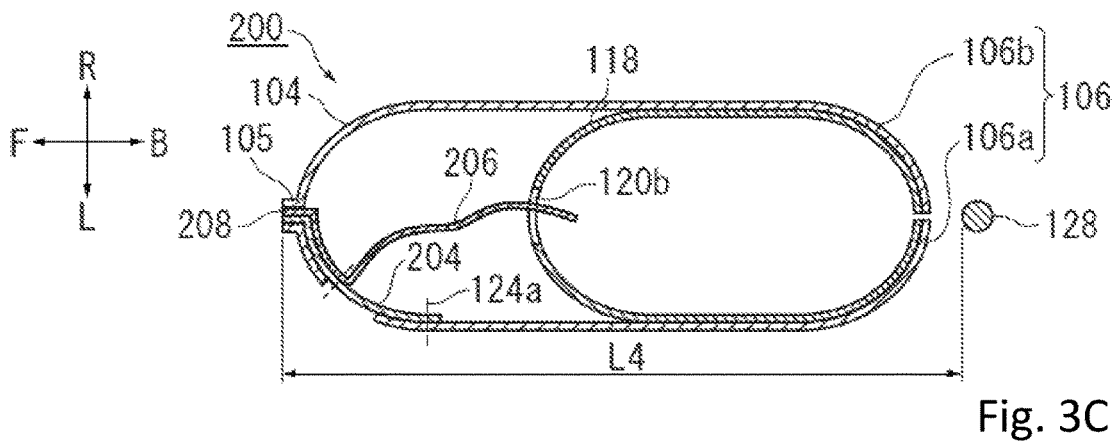
FIG. 3C is a cross-sectional similar to FIG. 3B shown after the tether is cut.

Unlike FIG. 3B, FIG. 3C shows a state of the cushion 104 when the injury value for the occupant is expected to become low during the restraint. In this case, because the tether cutter 128 is operated, the tether 206 is cut. As a result, the patch 204 covers in such a way as to stick the vent hole 202 by the gas pressure and keeps the vent hole 202 closed so as to prevent the gas from discharging from the cushion 104. As a result, the pressure of the cushion 104 can be kept high. Therefore, the cushion 104 can sufficiently restrain the occupant by the high internal pressure.

As explained above, according to the side airbag device 200, it is also possible that the choice of the presence or absence of the discharge of the gas is performed according to the various conditions such as according to the various conditions such as the collision speed, the collision angle, the physique of the occupant, and collision energy at the vehicle collision so as to adjust the internal pressure of the cushion 104. As a result, it is possible that the occupant is efficiently restrained without the increase of the injury value for the occupant.

Third Embodiment

FIG. 4 is a diagram that exemplarily shows a side airbag device 300 according to a third embodiment of the present invention. The side airbag device 300 is different from the side airbag device 200 exemplarily shown in FIG. 3 with respect to a slit 304 provided in a patch 302. The slit 304 is provided as a cut that extends in the vertical direction, i.e., in a direction crossing the longitudinal direction of the tether 306 between the vent hole 202 and the sewing part 124a beside the vent hole 202.

Figure 4A:
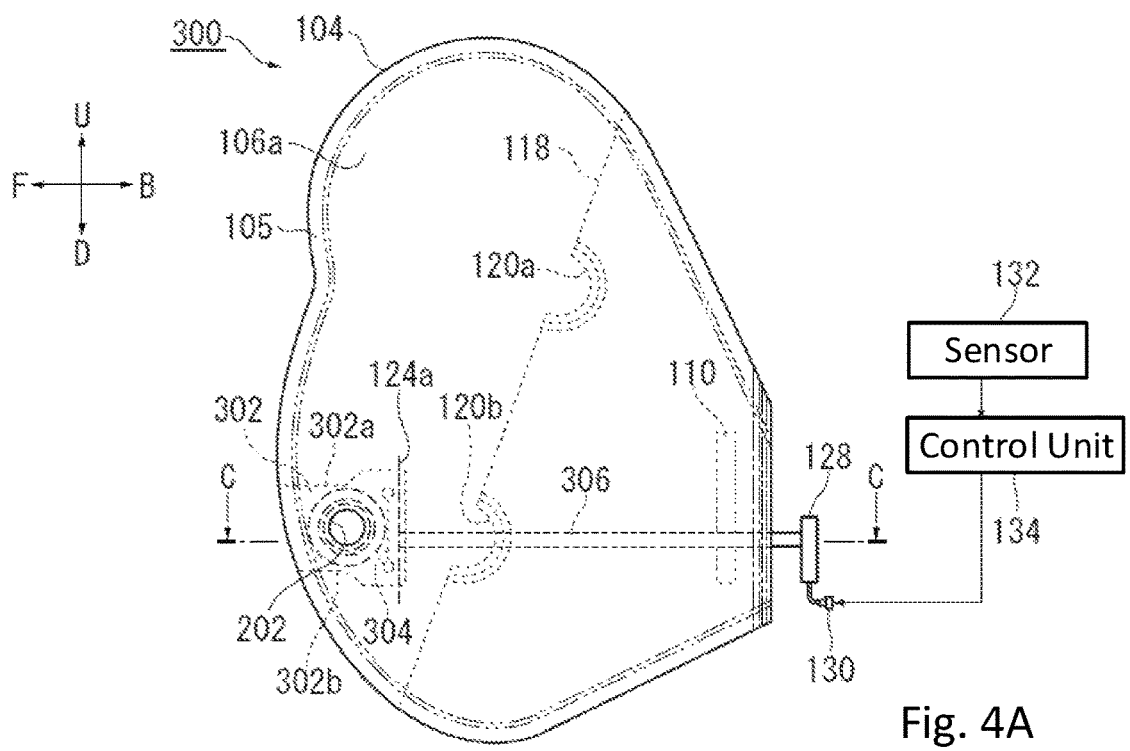
FIG. 4A is another side view similar to FIG. 3A illustrating a side airbag device according to a third embodiment of the present invention.
Figure 4B:
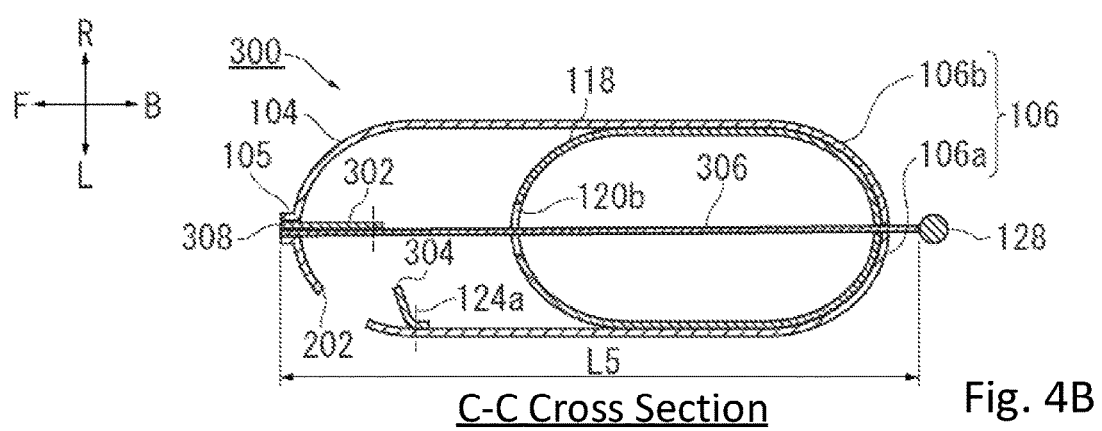
FIG. 4B is a cross-sectional view taken along the line C-C of FIG. 4A before the tether is cut.

FIG. 4B is a cross sectional view along the C-C line of the cushion 104 shown in FIG. 4A. FIG. 4B exemplarily shows a state after the inflator 110 moves and corresponds to a case in which the injury value for the occupant is expected to become high during the restraint. In that case, because the tether cutter 128 does not move, the patch 302 is pulled by a tether 306 so that the vent hole 202 is opened.

The tether 306 has mostly the same configuration as the tether 206 shown in FIG. 3B, however, the tether 306 penetrates the patch 302 in the vehicle longitudinal direction through the slit 304 and an intermediate portion the tether 306 in the longitudinal direction is connected to the outside of the patch 302 by sewing. Further, a front end 308 of the tether 306 together with the patch 302 are sewed together with the outer peripheral sewing part 105 located further to the vehicle front side than the vent hole 202.

In the same manner as the tether 206 shown in FIG. 3B, a length L5 of the tether 306 can also be set to be mostly the same length as the length L4 (refer to FIG. 4C) between the front end (the outer peripheral sewing part 105) of the cushion 104 and the tether cutter 128 or less at the time of the expansion and the deployment of the cushion 104. As a result, the tether 306 becomes tensed in the vehicle longitudinal direction at the center in the vehicle width direction of the cushion 104 according to the expansion and the deployment of the cushion 104.

Because the tether 306 passes at the outside of the patch 302 through the slit 304, by the tension of the tether 306, part of the patch 302 that is located at the vehicle front side than the slit 304 moves to the center side in the vehicle width direction of the cushion 104 along with the tether 306. As a result, because the gas passes through not only a space between the upper and lower ends 302a and 302b (refer to FIG. 4A) of the patch 302 and the main panel 106, but also from the slit 304, the gas is efficiently discharged by the guide of the vent hole 202. As a result, because the internal pressure of the cushion 104 is further suppressed and the rigidity of the main panel 106 is also further reduced, even also when the occupant who has the higher moving speed contacts with the main panel 106, the load that the occupant receives can be efficiently suppressed.

Figure 4C:
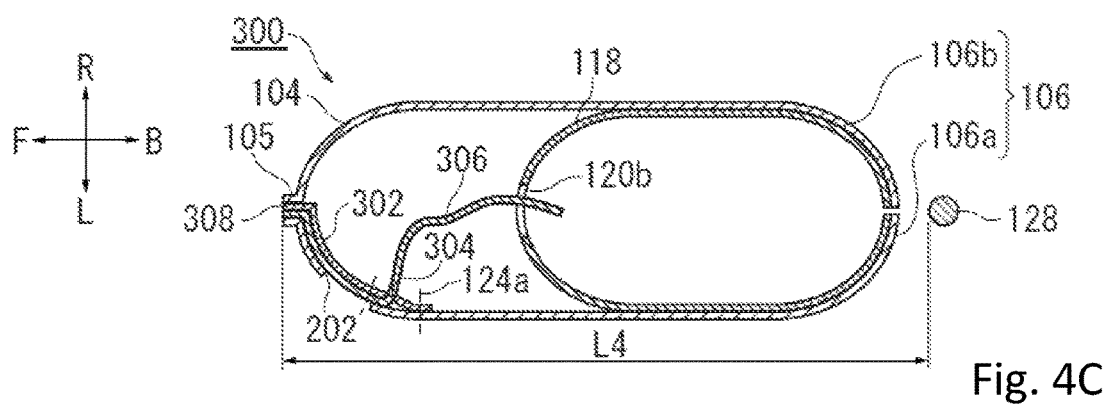
FIG. 4C is a cross-sectional similar to FIG. 4B shown after the tether is cut.

Unlike FIG. 4B, FIG. 4C shows a state of the cushion 104 when the injury value for the occupant is expected to become low during the restraint. In this case, because the tether cutter 128 is operated, the tether 306 is cut. As a result, the patch 302 covers in such a way as to stick the vent hole 202 by the gas pressure and keeps the vent hole 202 closed so as to prevent the gas from discharging from the cushion 104. As a result, the pressure of the cushion 104 can be kept high. Therefore, the cushion 104 can sufficiently restrain the occupant by the high internal pressure.

As explained above, also according to the side airbag device 300, it is also possible that the choice of the presence or absence of the discharge of the gas is performed according to the various conditions such as according to the various conditions such as the collision speed, the collision angle, the physique of the occupant, and collision energy at the vehicle collision so as to adjust the internal pressure of the cushion 104. In particular, in the present embodiment, by providing the slit 304 to the patch 302, it is possible to discharge the gas further efficiently. As a result, it is possible that the occupant is efficiently restrained without the increase of the injury value for the occupant.

Variation of Sewing Part

Figure 5:
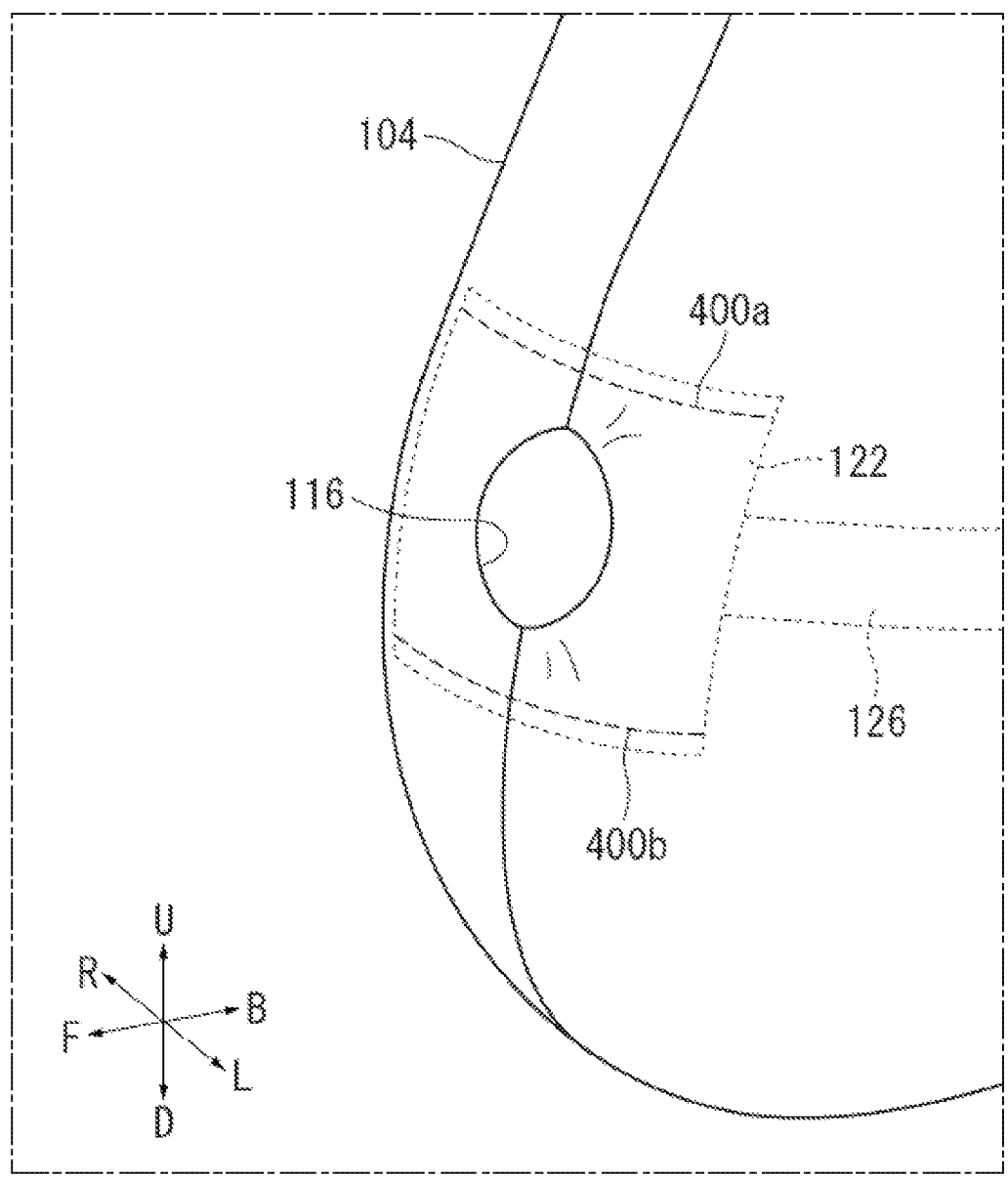
FIG. 5 is a diagram that shows a variation of a sewing part exemplarily shown in, for example, FIG. 2B.

FIG. 5 is a diagram that exemplarily shows a variation of the sewing parts 124a and 124b shown in, for example, FIG. 2B. Sewing parts 400a and 400b shown in FIG. 5 are different from the sewing parts 124a and 124b shown in, for example, FIG. 2B with respect to the provided position.

The sewing parts 400a and 400b connect both-side parts of the cushion 104 in the vehicle vertical direction sandwiching the vent hole 116 to the patch 122 by sewing. The sewing parts 400a and 400b are also linearly provided in parallel with each other. As explained above, in the same manner as the sewing parts 400a and 400b and the sewing parts 124a and 124b shown in, for example, FIG. 2B, each of the sewing parts can be suitably provided at both-side parts in each direction sandwiching the vent hole 116.

Further, two sewing parts do not need to be always provided in parallel, and also do not need to be linear provided. When the patch 122 is pulled by the tether 126, the sewing part may have the configuration in which a gap through which the gas passes can be formed between the patch 122 and the vent hole 116, for instance, it is also possible that the sewing part is formed in a curved shape along the vent hole 116.

Although the preferred embodiments of the present invention have been described with reference to the attached drawings, the above-described embodiments are preferred examples of the present invention, and other embodiments can also be carried out in various ways. Unless there is a limited description in the specification, the present invention should not be limited to the detailed shape, size, configuration, and arrangement of parts shown in the attached drawings. Further, the expressions and terms used in the specification are for illustrative purposes, and unless there is a limited description, the same are not limited thereto.

Accordingly, it will be apparent to one of ordinary skill in the art to conceive various modifications within the scope of the claims. All such modifications are intended to be included within the technical scope of the present invention. For instance, in the present invention mentioned above, in the side airbag device 100, the cushion 104 can be provided either at the near side or at the far side of the seat back 108 in the vehicle. However, in addition to the above descriptions, it is also possible that the side airbag device according to the present invention is used to a single-seated vehicle seat, for instance, such as a small mobility.

INDUSTRIAL APPLICABILITY OF THE INVENTION

The present invention can be utilized to a side airbag device that has an inflator that supplies a gas and an airbag cushion that is provided at a side part of a vehicle seat and that is expandable from the side part to a vehicle front side by the gas.

What is claimed is:

1. A side airbag device comprising:
   an inflator for supplying a gas;
   an airbag cushion disposed at a side of a seat of a vehicle and expandable from the side in a forward direction of the vehicle by the gas;
   a vent hole at in the airbag cushion proximate a front side of the airbag cushion for discharging the gas from the airbag cushion;
   a patch that openably covers the vent hole from an inside of the airbag cushion;
   a tether connected to the patch and to a predetermined position of the side of the seat, the tether normally operative to open the vent hole when the airbag cushion is expanded and deployed; and
   a tether cutter for cutting the tether in response to information relating to a state of the vehicle,
   wherein the patch is located proximate a front side of the airbag and the tether cutter is located proximate a rear side of the airbag, and further wherein the patch is movable from an open position for venting gas through the vent hole to a closed position preventing gas from venting through the vent hole in response to cutting of the tether.

2. The side airbag device according to claim 1, further comprising:
   sewing parts in which the patch and first and second side areas of the airbag cushion that sandwich the vent hole are connected by sewing.

3. The side airbag device according to claim 2, wherein the sewing parts are linearly provided in parallel with each other at the first and second side areas of the airbag cushion that sandwich the vent hole.

4. The side airbag device according to claim 1, wherein the vent hole is provided in an edge of a vehicle front side of the airbag cushion.

5. The side airbag device according to claim 1, wherein the vent hole is provided in a side surface of the airbag cushion in a vehicle width direction.

6. The side airbag device according to claim 5, wherein an intermediate portion of the tether in a longitudinal direction is connected to the patch, and
   a front end of the tether is connected to an inner position of the airbag cushion, and the inner position is located further to a vehicle front side than the vent hole.

7. The side airbag device according to claim 5, wherein the patch has a slit that extends in a direction crossing a longitudinal direction of the tether.

8. The side airbag device according to claim 7, wherein the tether passes through the patch via the slit in a vehicle front direction and a vehicle rear direction.

9. The side airbag device according to claim 1, wherein the tether is connected to the patch at a center of the vent hole.

10. The side airbag device according to claim 9, wherein the airbag cushion has an outer peripheral sewing part in which a base cloth at an edge of the airbag cushion is sewed, and
    one end of the patch and one end of the tether are sewed together with the outer peripheral sewing part.

11. The side airbag device according to claim 1, wherein the inflator is disposed inside of the airbag cushion at a vehicle rear side,
    the side airbag device further including:
       an inner bag that is provided inside of the airbag cushion, a base cloth of the inner bag surrounds the inflator; and
       an inner vent that is disposed at the front side of the inner bag and through which the gas is passable, and
    wherein the tether passes through the inner vent so as to be connected to the patch and the predetermined position of the side of the seat.

12. The side airbag device according to claim 11, wherein the inner vent is located on a linear line connecting between the patch and the predetermined position of the side of the seat.

13. The side airbag device according to claim 1, wherein the patch is attached to inner surfaces of the airbag at laterally opposite sides of the airbag.

14. A side airbag device comprising:
    an inflator for supplying a gas;
    an airbag cushion disposed at a side of a seat of a vehicle and expandable from the side in a forward direction of the vehicle by the gas;
    a vent hole at in the airbag cushion proximate a front side of the airbag cushion for discharging the gas from the airbag cushion;
    a patch that openably covers the vent hole from an inside of the airbag cushion;
    a tether connected to the patch and to a predetermined position of the side of the seat, the tether normally operative to open the vent hole when the airbag cushion is expanded and deployed; and
    a tether cutter for cutting the tether in response to information relating to a state of the vehicle,
    wherein an intermediate portion of the tether in a longitudinal direction is connected to the patch, and a front end of the tether is connected to an inner position of the airbag cushion, and the inner position is located further to a vehicle front side than the vent hole.

15. The side airbag device according to claim 14, wherein the vent hole is provided in a side surface of the airbag cushion in a vehicle width direction.

16. A side airbag device comprising:
    an inflator for supplying a gas;
    an airbag cushion disposed at a side of a seat of a vehicle and expandable from the side in a forward direction of the vehicle by the gas;
    a vent hole at in the airbag cushion proximate a front side of the airbag cushion for discharging the gas from the airbag cushion;
    a patch that openably covers the vent hole from an inside of the airbag cushion;
    a tether connected to the patch and to a predetermined position of the side of the seat, the tether normally operative to open the vent hole when the airbag cushion is expanded and deployed; and a tether cutter for cutting the tether in response to information relating to a state of the vehicle, wherein the airbag cushion has an outer peripheral sewing part in which a base cloth at an edge of the airbag cushion is sewed, and one end of the patch and one end of the tether are sewed together with the outer peripheral sewing part.

17. The side airbag device according to claim 16, wherein the tether is connected to the patch at a center of the vent hole.

18. A side airbag device comprising:

an inflator for supplying a gas;

an airbag cushion disposed at a side of a seat of a vehicle and expandable from the side in a forward direction of the vehicle by the gas;

a vent hole at in the airbag cushion proximate a front side of the airbag cushion for discharging the gas from the airbag cushion;

a patch that openably covers the vent hole from an inside of the airbag cushion;

a tether connected to the patch and to a predetermined position of the side of the seat, the tether normally operative to open the vent hole when the airbag cushion is expanded and deployed; and a tether cutter for cutting the tether in response to information relating to a state of the vehicle, wherein the patch has a slit that extends in a direction crossing a longitudinal direction of the tether.

19. The side airbag device according to claim 18, wherein the vent hole is provided in a side surface of the airbag cushion in a vehicle width direction.

20. The side airbag device according to claim 18, wherein the tether passes through the patch via the slit in a vehicle front direction and a vehicle rear direction.

* * * * *